Figure 1:
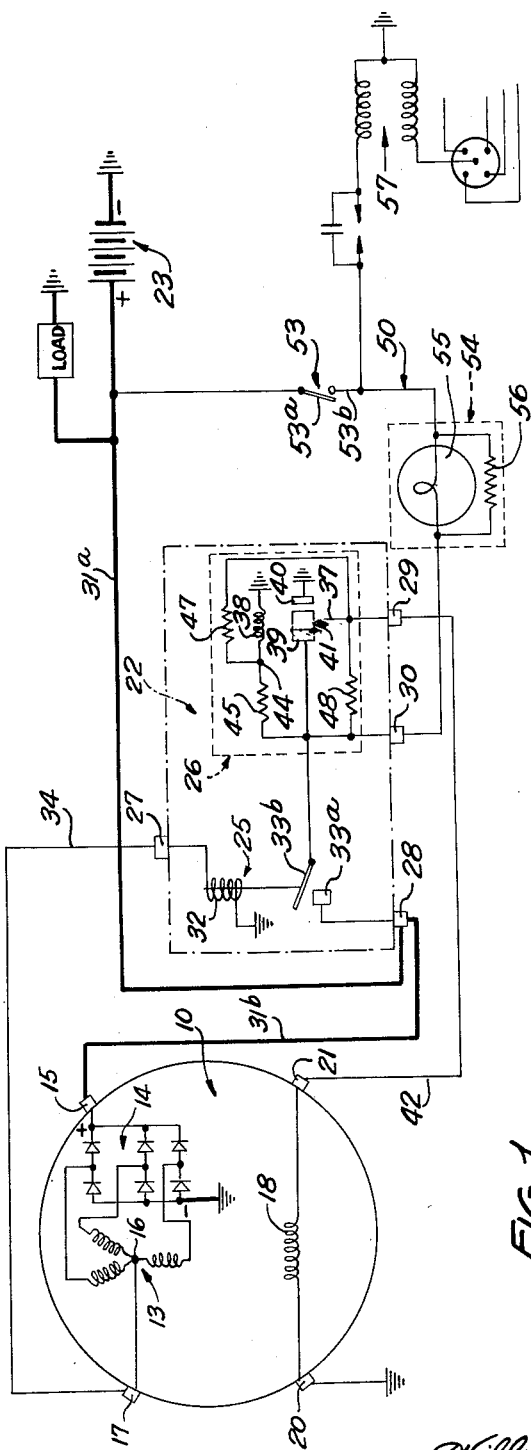

April 16, 1963  C. J. DE CARBO ETAL  3,086,161
ELECTRIC GENERATING SYSTEMS
Filed Nov. 6, 1961

INVENTORS
CHARLES J. DE CARBO
JOHN W. KORDA
BY
Williams, David, Hoffmann & Yount
ATTORNEYS

United States Patent Office 3,086,161
Patented Apr. 16, 1963

3,086,161
ELECTRIC GENERATING SYSTEMS
Charles J. De Carbo, Cleveland Heights, and John W. Korda, East Cleveland, Ohio, assignors to The Leece-Neville Company, Cleveland, Ohio, a corporation of Ohio
Filed Nov. 6, 1961, Ser. No. 150,396
14 Claims. (Cl. 322—11)

The present invention relates to an electric generating system for supplying a unidirectional current to load conductors having a battery connected thereacross.

The electric generating system to which the present invention relates has a generating machine which includes a field winding; and a field relay, which has normally open contacts that break the field circuit, is energized when the generating machine is up to a predetermined potential to connect the field circuit across the output of the machine and the battery, the field circuit including the normally closed contacts of a voltage regulator that is operated in response to the voltage across the load conductors to control the energization of the field after the relay contacts are closed. In the preferred system, the electric generating machine is of the alternator-rectifier type, with the output of the alternator-rectifier unit being directly connected to the battery, both when the unit, i.e., generating machine, is operating and when the generating machine is not operating.

An important object of the present invention is to provide a new and improved electric generating system including a generating machine and battery which are connected in parallel during operation of the machine and in which a field relay for connecting and disconnecting the field winding of the machine from across the battery and machine output also controls a charge-indicating lamp.

Another object of the present invention is to provide a new and improved electric generating system for supplying a unidirectional potential to a load including a battery and in which a field relay has normally open contacts which are closed when the output of the generating machine comes up to a predetermined voltage to connect the field winding of the machine across the output of the electric generating system and the battery, the system including a bleed resistance connected across the field relay contacts to supply a bleed current to the field winding before the machine comes up to voltage, the bleed circuit including manually-controlled contacts and preferably a lamp for indicating the condition of the field relay contacts to, in turn, indicate whether or not the voltage of the generating machine has been built up sufficiently to charge the battery.

A further object of the present invention is to provide a new and improved electric generating system of the alternator-rectifier type in which a field relay is operated to connect the field across the output of the alternator-rectifier unit and across a battery connected to the alternator-rectifier unit and in which a charge-indicating circuit including manually-controlled contacts is connected across the field relay contacts, so that, when the manually-controlled contacts are closed, a circuit is completed from the battery through the manually-controlled contacts and the field winding, the circuit being shorted when the field contacts close.

A further object of the present invention is to provide a new and improved electric generating system for supplying a unidirectional current to load conductors having a battery connected thereacross, the generating system comprising a field circuit including a voltage regulator to be connected across the output of the electric generating system and battery to control the output voltage of the electric generating system; and a field relay which has normally open contacts that are closed to connect the field circuit and voltage regulator to one of the load conductors to energize the field circuit and the voltage regulator; and in which a resistance circuit including manually-controlled switch contacts, e.g., ignition switch contacts, is connected across the field relay contacts so that when the switch contacts close, a bleed current is supplied to the field circuit.

A still further object of the present invention is to provide a new and improved electric generating system as in the next preceding object wherein the resistance circuit includes a charge-indicating lamp.

Yet another object of the present invention is to provide a new and improved electric generating system for supplying a unidirectional potential wherein ignition switch contacts for controlling field energization from the battery are not required to carry the full field current or load current when the generating system is operating to supply current to a load.

In accordance with the present invention, a electric generating system for supplying a unidirectional potential to load conductors having a battery connected thereacross includes a generating machine having a field winding which is energizable to control the output voltage of the generating machine and which is connected across the load conductors to be energized by the voltage thereon when the generating machine comes up to voltage by the closing of field relay contacts which connect the field energizing circuit with one of the load conductors and which also control the energization and de-energization of the voltage relay coil having normally closed contacts in the field energizing circuit. The field relay contacts have a resistance circuit connected thereacross which includes manually-controlled switch contacts, preferably ignition switch contacts, when the system is a vehicle generating system driven by an ignition-type engine, which, when closed, provide a bleed current through the resistance circuit to energize the field with the resistance circuit being shorted by the closing of the field contacts when the generating machine comes up to a certain voltage. Preferably, the bleed resistance circuit includes a lamp for indicating the condition of the field relay contacts to, in turn, indicate whether the potential of the generating machine is above or below battery potential.

Figure 2:
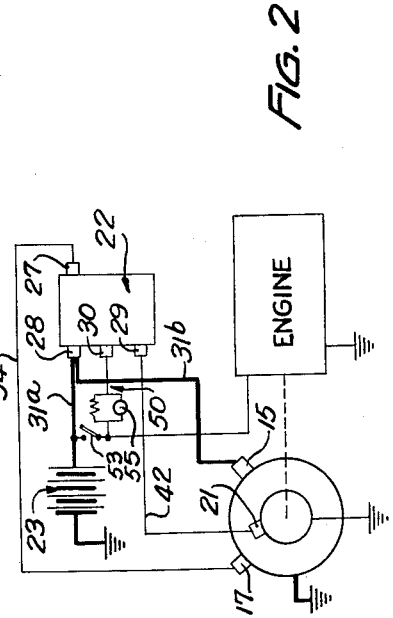

Further objects and advantages of the present invention will be apparent from the following detailed description thereof made with reference to the accompanying drawing forming a part of the present specification and in which:

FIG. 1 is a schematic showing of an electrical generating system embodying the present invention and adapted for use in an automotive vehicle; and FIG. 2 is a schematic showing of a vehicle system.

Referring to the drawing, the electrical system shown therein is well suited for vehicle use but is also adaptable for use for other purposes. The electrical system shown comprises, in general, a generating system for supplying a unidirectional current and the generating system is shown as an alternator-rectifier unit 10. The alternator-rectifier is adapted to be driven at variable speeds as by a vehicle engine E, shown schematically in FIG. 2, and has a three-phase Y-connected stator winding connected through a full wave rectifier 14 to a positive output terminal 15 and to ground. The three-phase Y-connected stator winding has a neutral point 16 connected to a terminal 17. The alternator-rectifier unit also includes a field winding 18 on the rotor of the alternator and, as will be well understood by those skilled in the art, the rotor is driven at variable speeds from the vehicle engine when the electrical system is embodied in a vehicle.

The field winding 18 is connected to a ground terminal 20 and to a field terminal 21 of the alternator-rectifier unit.

In addition to the alternator-rectifier unit, the system shown in the drawing comprises a control unit 22 and a battery 23 connected across the output of the alternator-rectifier unit 10.

While the alternator-rectifier unit 10 has been shown as a particular type generating unit, it will be understood by those skilled in the art that certain features of the invention may be used with other types of generating units, such as a direct current machine.

The control unit 22 includes a field relay 25 and a voltage regulator 26 and has a neutral terminal 27, a battery terminal 28, a field terminal 29 and a lamp terminal 30 whose purpose will be described in more detail hereinafter. The battery 23, in the illustrated embodiment, has its positive terminal connected to the battery terminal 28 of the control unit 22 by a load conductor 31a and to the positive terminal 15 of the alternator-rectifier unit by a conductor 31b from the battery terminal 28 to the terminal 15 of the alternator-rectifier unit 10. The negative terminal of the battery is connected to ground, as is the negative terminal of the output of the alternator-rectifier unit 10, so that the alternator-rectifier unit, in the described embodiment, is always directly connected to the battery 23 through the conductors 31b, 31a and through ground.

The field relay 25 in the control unit 22 has a field relay coil 32 and normally open contacts 33a, 33b. The field relay coil has one side connected to the neutral terminal 27 of the control unit and its other side connected to ground. The neutral terminal 27 of the control unit is connected, by a conductor 34, to the neutral terminal 17 of the alternator-rectifier unit 10 so that the field relay coil 32 is energized when the neutral point 16 on the three-phase winding 13 is at a predetermined voltage relative to ground.

When the field relay coil 32 is energized, the closing of its contacts 33 connects a circuit for energizing the field winding 18 and including contacts of the voltage regulator 26 to the terminal 28 of the control unit to effect the energization of the field winding through the contacts of the voltage regulator 26. The voltage regulator 26 may be of a conventional type and is shown as having a vibratory armature 37 which is operated by a voltage regulator coil 38 and is moved between two stationary contacts 39, 40 upon changes in the voltage applied to the coil 38 between two levels. The vibrating armature carries contact means 41 which is in engagement, when the voltage applied to the coil 38 is below a certain level, with the stationary contact 39 and with the stationary contact 40 when voltage of the coil 38 is increased above that level so that it is sufficient to operate the armature.

The vibratory armature 37 is connected to the field terminal 29 of the control unit 22 and the field terminal 29 is connected to the field terminal 21 of the alternator-rectifier unit by a connection 42. The field winding 18 is connected between the alternator-rectifier terminals 20, 21, with the former terminal being connected to ground. Consequently, when the field relay 25 is energized, a circuit for supplying current to the field winding 18 is provided through the closed contacts 33a, 33b of the field relay and the closed contacts 39, 41 of the voltage regulator as long as the voltage regulator coil 38 is not sufficiently energized.

The contacts 33a, 33b also, when closed, make a circuit for energizing the regulator coil 38. The voltage regulator coil 38 has one side connected to a junction 44 which is connected to the contact 33b through a resistance 45. The other side of the voltage regulator coil 38 is connected to ground so that, when the contacts 33a, 33b of the field relay 25 are closed, the resistance 45 and voltage relay coil are connected across the positive terminal of the alternator-rectifier unit 10 and ground.

The junction 44 in the control unit is also connected to the vibratory armature 37 through a resistance 47 and the armature 37 is connected to the contact 33b through a resistor 48. When the switch contact means 41 on the vibratory armature 37 is in engagement with the stationary contact 39, the resistor 47 is connected to the contact 33b of the field relay in parallel with the resistance 45 and the resistance 48 is short-circuited. Consequently, the voltage drop across the voltage regulator relay 38 is determined by the ratio of the coil resistance to the resistance of the parallel-connected resistors 45, 47. When the voltage regulator coil 38 is energized and the contact means 41 moved into engagement with the stationary contact 40, which is connected to ground, the vibratory armature 37 is grounded and, therefore, the resistance 47 is connected in parallel with the voltage regulator coil 38 between the junction 44 and ground. Also, the resistance 48 is connected between the contact 33b and ground, in parallel with a circuit comprising parallel circuits including the voltage regulator coil 38 and the resistance 47 in series with the resistance 45. In view of the fact that the resistance 47 is no longer in parallel with the resistance 45 but is now in parallel with the regulator coil, the proportion of the total voltage drop between the terminal 28 and ground, which occurs across the voltage regulator coil 38, is smaller than when the resistance 47 was in parallel with the resistance 45. Consequently, the voltage regulator coil will drop out unless the voltage of the alternator-rectifier unit 10 has risen to a sufficiently high magnitude to maintain the coil energized. This will produce a cyclic operation of the voltage regulator which makes and breaks the field circuit in response to the output voltage of the alternator-rectifier to stabilize the output voltage at the desired magnitude.

The voltage regulator is of a conventional type and its operation well understood by those skilled in the art and, consequently, a further description thereof is not deemed necessary.

When starting the alternator-rectifier unit from rest, it is desirable that the field winding be energized to aid in bringing the unit up to its voltage where the field relay 25 operates. To this end, a resistance circuit 50 is connected between the terminal 30 of the control unit 22 and the conductor 31a, which is the conductor connected to the positive terminal of the battery. The series circuit 50 is, therefore, connected across the contacts 33a, 33b of the field relay 25 and is shorted by these contacts when they are closed. When the contacts 33a, 33b are open, the resistance circuit 50 provides a path for energizing the field winding 18 from the battery 23. This path may be followed from the conductor 31a through the resistance circuit 50, the terminal 30 of the control unit 22, the contacts 39, 41 of the voltage regulator, and the field terminal 29 of the control unit 22. This circuit will provide a bleed current to the field to energize the field winding 18 on starting. In order to prevent a bleed current from flowing when the system is not being used, the series resistance circuit 50 includes manually-controlled contacts 53. The contacts 53 include a contact 53a connected directly to the conductor 31a and a contact 53b connected through a resistance 54 to the terminal 30 of the control unit 22. When the alternator-rectifier unit 10 is driven by an internal combustion engine, the switch 53 may be controlled by the starting switch for the engine and, in the case of a gasoline engine, would be the ignition switch. The drawing illustrates the switch as an ignition switch and the contact 53b is connected to an ignition circuit, designated generally by the reference numeral 57, to energize the latter upon the closing of the ignition switch 53.

The resistance 54 in the circuit 50 preferably comprises a lamp 55 and, in the illustrated and preferred embodiment, a resistor 56 is connected in parallel with the lamp 55. A voltage will appear across the lamp 55 only when the field relay contacts 33a, 33b are open and the ignition switch closed. Consequently, the lamp 55 indicates the condition of the field relay contacts which, in turn, indicate whether the voltage of the generating machine is sufficiently high to energize the field relay coil 32. The lamp 55 is, consequently, suitable for use as the "charge" lamp on a motor vehicle. The lamp and resistor 56 can be mounted on the dashboard so that the lamp can be viewed by the operator of the vehicle.

Reviewing the operation of the electrical system, the battery 23 may be used to supply current to a load when the alternator-rectifier unit 10 is at rest. With the alternator-rectifier unit 10 at rest, the switch 53 will be open and the relay coils 32, 38 of the field relay in the voltage regulator de-energized so that the field relay contacts 33a, 33b are open and the voltage regulator contacts 39, 41 are closed. In a system where the alternator-rectifier unit is driven from an engine and the switch 53 is closed on the starting of the engine, the closing of the switch 53 will complete the resistance circuit 50 for supplying a bleed current to the field winding 18 of the alternator-rectifier unit 10. This circuit is completed through the lamp 55, the control unit terminal 30, the contacts 39, 41 of the voltage regulator, the control unit terminal 29, conductor 42, and the field winding 18 of the alternator-rectifier unit. The lamp 55 will remain lighted until the voltage between the neutral 16 of the three-phase stator winding 13 and ground is high enough to energize the field relay coil 32 to close the contacts 33a, 33b. When these contacts are closed, the lamp 55 will be extinguished, since the contacts short-circuit the resistance circuit 50, and the field winding 18 will be connected directly to the conductors 31a, 31b by the contacts 33a, 33b and the voltage regulator contacts 39, 41. The voltage regulating coil 38 is also connected to the conductors 31a, 31b when the contacts 33a, 33b are closed and when the alternator-rectifier unit 10 reaches the output voltage at which it is to operate, the voltage regulator coil will be cyclically energized and de-energized to vibrate the armature 37 to energize and de-energize the field winding circuit to maintain the alternator output voltage at its operating voltage. The operating voltage is higher than the voltage at which the field relay coil 32 is energized.

It will be noted that the ignition switch contacts or the starting switch, as the case may be, is not subjected to either the load current or to the full current flowing in the field winding 18. Moreover, if a shorted diode occurs in the alternator or an open field circuit or a grounded field circuit, the relay coil 32 will not be energized, since the alternator will not come up to voltage and the lamp 55 will remain illuminated. If an open circuit occurs in the field winding, the lamp 55 is energized through the resistance 45 and the voltage regulator coil 38 upon the closing of the ignition switch 53. If the field circuit is grounded, then the lamp is energized by a circuit through the normally closed regulator contacts 39, 41 and the ground.

While the resistor-lamp combination has been disclosed in the preferred embodiment, it is to be understood that a single resistance might be substituted or that a lamp only might be used provided the resistance of the lamp is such as to provide the desired bleed current.

From the foregoing, it can be seen that a new and improved electrical system, including an electrical generating machine for supplying a unidirectional current to a load including a battery, has been provided and that a resistance circuit for providing bleed current to the field winding of the generating machine is provided and is effective when a field relay for connecting the field circuit across the output of the generating machine is de-energized and rendered ineffective by the energization of the relay and that the system is so constructed and arranged that manually-controlled switch contacts for starting an engine for driving the generating machine make and break the resistance circuit for supplying bleed current to the field winding on starting and control the circuit without carrying load current or field winding current.

While the preferred embodiment of the present invention has been shown and described in detail, it is hereby our intention to cover all arrangements, modifications and constructions thereof which fall within the spirit and scope of the present invention.

Having described our invention, what we claim is:

1. In an electrical system, a battery, a generating machine for supplying unidirectional current and having output terminals, load conductors connecting said battery across said terminals, said machine having a field winding and a field energizing circuit including said winding connected to one of said conductors, first contacts operable to connect said field energizing circuit to the other of said conductors, means responsive to the voltage of said generating machine to close said contacts when the voltage reaches a predetermined magnitude, and a resistance circuit connected across said contacts and effective to energize said field energizing circuit when said contacts are open, said resistance circuit including manually-controlled switch contacts.

2. An electrical system as defined in claim 1 wherein said resistance circuit includes a lamp which is energized when said first contacts are open and said switch contacts closed and de-energized on the closing of said first contacts.

3. An electrical system as defined in claim 1 wherein said switch contacts are contacts on an ignition switch for an engine for driving said machine.

4. In an electrical system, a battery, a generating machine for supplying unidirectional current and having output terminals, load conductors connecting said battery across said terminals, said machine having a field winding and a field circuit including said winding connected to one of said conductors, first contacts operable to connect said field circuit to the other of said conductors, means responsive to the voltage of said generating machine to close said contacts, and a resistance circuit connected across said contacts and effective to energize said field circuit when said first contacts are open, said resistance circuit including manually-controlled switch contacts, and said electrical system including a voltage regulator having normally closed contacts in said field circuit.

5. An electrical system as defined in claim 4 wherein said resistance circuit includes a lamp which is energized when said first contacts are open and said switch contacts closed and de-energized on the closing of said first contacts.

6. In an electrical system, a battery, a generating machine for supplying unidirectional current and having output terminals, load conductors connecting said battery across said terminals, said machine having a field winding and a field circuit including said winding connected to one of said conductors, first contacts operable to connect said field circuit to the other of said conductors, means responsive to the voltage of said generating machine to close said contacts, and a resistance circuit connected across said contacts including manually-controlled switch contacts and effective to energize said field circuit when said first contacts are open and said switch contacts closed, said electrical system including a voltage regulator having normally closed contacts in said field circuit between said first contacts and said field winding and a voltage regulator coil connected to said one conductor and to the other conductor through said first contacts.

7. In an electrical system for a vehicle, a pair of positive and negative load conductors, a battery connected across said conductors, an alternator, a rectifier for rectifying the output of said alternator and having positive and negative output terminals connected to said positive and negative conductors respectively, said alternator having a field winding, a field energizing circuit including said field winding connected to one of said conductors, normally open relay contacts operable to connect said circuit to the other of said conductors, a relay coil energized in response to a condition indicative of alternator output voltage for closing and opening said relay contacts when the voltage is respectively above and below a predetermined magnitude, and a resistance circuit connected across said relay contacts including manually-controlled switch contacts and effective to energize said winding from said battery when said switch contacts are closed and said relay contacts open.

8. In an electrical system as defined in claim 7 wherein said switch contacts are contacts of an ignition switch for an engine for driving said alternator.

9. In an electrical system for a vehicle, a pair of positive and negative load conductors, a battery connected across said conductors, an alternator, a rectifier for rectifying the output of said alternator and having positive and negative output terminals connected to positive and negative conductors respectively, said alternator having a field winding, a field circuit including said field winding connected to one of said conductors, normally open relay contacts operable to connect said circuit to the other of said conductors, a relay coil energized in response to a condition indicative of alternator output voltage for closing and opening said contacts when the alternator voltage is respectively above and below a predetermined magnitude, and a resistance circuit connected across said relay contacts and including manually-controlled switch contacts and effective to energize said field circuit from said battery when said switch contacts are closed and said relay contacts open, said alternator having a three-phase Y-connected winding connected to said rectifier and said coil being connected between the neutral point of said three-phase winding and one of said load conductors.

10. In an electrical system for a vehicle, a pair of positive and negative load conductors, a battery connected across said conductors, an alternator, a rectifier for rectifying the output of said alternator and having positive and negative output terminals connected to positive and negative conductors respectively, said alternator having a field winding, a field circuit including said field winding connected to one of said conductors, normally open relay contacts operable to connect said circuit to the other of said conductors, a relay coil energized in response to a condition indicative of alternator output voltage for closing and opening said contacts when the voltage is respectively above and below a predetermined magnitude, a resistance circuit connected across said relay contacts and adapted to energize said field circuit when said relay contacts are open, said circuit including manually-controlled switch contacts for making and breaking the circuit and a light which is lighted when said switch contacts are closed and said relay contacts open.

11. An electrical system as defined in claim 10 wherein said alternator is driven from an ignition-type engine and said switch contacts are contacts of an ignition switch which is operated to make the ignition circuit of said engine.

12. An electrical system as defined in claim 10 wherein said alternator unit is driven from an ignition-type engine and said switch contacts are contacts of an ignition switch which is operated to make the ignition circuit of said engine, said alternator having a three-phase Y-connected winding connected to said rectifier and said coil being connected between the neutral point of said three-phase winding and one of said load conductors.

13. In an electrical system for a vehicle, a pair of positive and negative load conductors, a battery connected across said conductors, an alternator, a rectifier for rectifying the output of said alternator and having positive and negative output terminals connected to positive and negative conductors respectively, said alternator having a field winding, a field circuit including said field winding connected to one of said conductors, normally open relay contacts operable to connect said circuit to the other of said conductors, a relay coil energized in response to a condition indicative of alternator output voltage for closing and opening said contacts when the voltage is respectively above and below a predetermined magnitude, a voltage regulator having regulator contacts in said field circuit between said relay contacts and said field winding and a voltage regulator coil, a coil circuit for energizing said regulator coil connected to said one conductor and to the other of said conductors through said relay contacts, and a resistance circuit connected across said relay contacts and including manually-controlled switch contacts and effective to energize said field circuit from said battery when said relay contacts are open and said switch contacts closed.

14. An electrical system as defined in claim 13 wherein said resistance circuit includes a lamp which is energized when said relay contacts are open and said switch contacts closed through a circuit including the field circuit or a circuit including said coil circuit.

No references cited.